United States Patent
Francisco et al.

(10) Patent No.: US 8,556,027 B2
(45) Date of Patent: Oct. 15, 2013

(54) EDUCTOR EXHAUST SILENCER ASSEMBLY WITH BYPASS GASFLOW

(75) Inventors: Jay M. Francisco, Chula Vista, CA (US); Anthony C. Jones, San Diego, CA (US); Greg R. Giddings, San Marcos, CA (US); Nagamany Thayalakhandan, San Diego, CA (US); Jason Peel, Encinitas, CA (US)

(73) Assignee: United Technologies Corporation, Hartford, CT (US)

( * ) Notice: Subject to any disclaimer, the term of this patent is extended or adjusted under 35 U.S.C. 154(b) by 166 days.

(21) Appl. No.: 13/170,600

(22) Filed: Jun. 28, 2011

(65) Prior Publication Data

US 2013/0001009 A1 Jan. 3, 2013

(51) Int. Cl.
- F02K 1/82 (2006.01)
- F02K 1/34 (2006.01)
- F01N 1/14 (2006.01)
- F02K 1/00 (2006.01)
- F01N 1/00 (2006.01)

(52) U.S. Cl.
USPC .......................................... 181/213; 181/220

(58) Field of Classification Search
USPC ................ 181/213, 214, 220; 244/53 B, 1 N; 415/119
See application file for complete search history.

(56) References Cited

U.S. PATENT DOCUMENTS

| | | | |
|---|---|---|---|
| 2,424,765 A | 7/1947 | McCollum | |
| 3,011,584 A | 12/1961 | Lemmerman et al. | |
| 3,489,377 A | 1/1970 | Pearson et al. | |
| 3,572,466 A | 3/1971 | Hom et al. | |
| 3,575,261 A | 4/1971 | Medawar et al. | |
| 3,620,329 A | 11/1971 | Wenzlaff | |
| 3,715,009 A | 2/1973 | Smith et al. | |
| 3,739,872 A | 6/1973 | McNair | |
| 4,060,985 A | 12/1977 | Fukushima | |
| 4,124,091 A | 11/1978 | Mizusawa | |
| 4,214,441 A * | 7/1980 | Mouritsen et al. | 60/262 |
| 4,215,536 A | 8/1980 | Rudolph | |
| 4,279,325 A | 7/1981 | Challis | |
| 4,372,110 A | 2/1983 | Cheng et al. | |
| 4,421,455 A | 12/1983 | Tomren | |
| 4,436,481 A | 3/1984 | Linder | |
| 4,531,356 A | 7/1985 | Linder | |
| 4,577,462 A | 3/1986 | Robertson | |
| 4,645,032 A | 2/1987 | Ross et al. | |
| 4,828,932 A | 5/1989 | Morimoto et al. | |
| 4,830,312 A | 5/1989 | Hain et al. | |
| 4,927,342 A | 5/1990 | Kim et al. | |
| 5,097,656 A | 3/1992 | Napier | |
| 5,140,819 A | 8/1992 | Napier et al. | |
| 5,162,620 A | 11/1992 | Ross et al. | |
| 5,184,455 A | 2/1993 | Ewing et al. | |
| 5,265,408 A | 11/1993 | Sheoran et al. | |
| 5,291,672 A | 3/1994 | Brown | |
| 5,351,489 A | 10/1994 | Okamoto et al. | |
| 5,373,691 A | 12/1994 | Gardner et al. | |

(Continued)

Primary Examiner — Edgardo San Martin
(74) Attorney, Agent, or Firm — Kinney & Lange, P.A.

(57) ABSTRACT

An exhaust silencer assembly for use with an auxiliary power unit includes an eductor and a discharge pipe. The eductor is disposed downstream of the auxiliary power unit and has an entrance opening at a forward axial end thereof. The entrance opening is configured to receive exhaust airflow from the auxiliary power unit. The discharge pipe extends from the auxiliary power unit and communicates with the exhaust silencer assembly downstream of the entrance opening of the eductor.

17 Claims, 6 Drawing Sheets

(56) References Cited

U.S. PATENT DOCUMENTS

| | | | |
|---|---|---|---|
| 5,655,359 A * | 8/1997 | Campbell et al. | 60/772 |
| 6,094,907 A | 8/2000 | Blackner | |
| 6,615,576 B2 * | 9/2003 | Sheoran et al. | 60/39.5 |
| 6,651,929 B2 * | 11/2003 | Dionne | 244/57 |
| 6,695,094 B2 | 2/2004 | Moffat et al. | |
| 6,735,951 B2 | 5/2004 | Thompson | |
| 7,093,447 B2 * | 8/2006 | Thompson et al. | 60/784 |
| 7,152,410 B2 | 12/2006 | Sheoran et al. | |
| 7,337,605 B2 * | 3/2008 | Hagshenas | 60/39.08 |
| 7,364,117 B2 * | 4/2008 | Dionne | 244/58 |
| 7,578,369 B2 | 8/2009 | Francisco et al. | |
| 7,923,668 B2 | 4/2011 | Layland et al. | |
| 8,235,170 B1 * | 8/2012 | Ertz et al. | 181/213 |
| 8,245,494 B2 * | 8/2012 | DeDe et al. | 60/39.83 |
| 2008/0236939 A1 * | 10/2008 | Napier et al. | 181/224 |
| 2011/0271686 A1 * | 11/2011 | Francisco et al. | 60/783 |
| 2012/0102910 A1 * | 5/2012 | Francisco et al. | 60/39.5 |
| 2012/0174595 A1 * | 7/2012 | Francisco et al. | 60/779 |

* cited by examiner

EDUCTOR EXHAUST SILENCER ASSEMBLY WITH BYPASS GASFLOW

BACKGROUND

The present invention relates to noise attenuation systems. In particular, the present invention relates to noise attenuation systems for use with gas turbine engines such as aircraft auxiliary power units.

Large commercial aircraft typically include on-board auxiliary power units, located in the tail sections of the aircraft, to provide electrical power and compressed air for systems throughout the aircraft. When an aircraft is on the ground, the primary propulsion engines of the aircraft are shut down, and the auxiliary power unit provides the main source of power for a variety of systems, such as the environmental control systems, hydraulic pumps, electrical systems, and main engine starters. The auxiliary power unit may also provide power during in-flight operations, such as for electrical and pneumatic systems.

In many gas turbine engine applications, particularly those in which the engine is used in conjunction with a commercial passenger aircraft, there is a widespread demand by the airline industry to maintain noise levels below defined limits. This is particularly important at ground service stations for the aircraft, where ground crew load and unload luggage, fuel and provision the aircraft, and remove waste materials from the aircraft. Under these conditions, the aircraft auxiliary power unit is the turbine engine of interest.

Noise generated during the operation of the auxiliary power unit typically includes low frequency noise generated during the combustion process within the turbine engine, and high frequency noise generated by the mixing of gases at the compressor portion of the turbine engine. The low frequency noise is typically attenuated with an exhaust silencer placed downstream from the auxiliary power unit. High frequency noise is typically attenuated in other manners.

The arrangement of the exhaust silencer downstream of the auxiliary power unit allows the exhaust silencer to dissipate acoustic energy of the low-frequency noise as the noise travels downstream from the exhaust diffuser. However, positioning the exhaust silencer downstream from the exhaust diffuser exposes the exhaust silencer to the exhaust gases emitted from the auxiliary power unit. The exhaust gases can convectively heat the exhaust silencer to elevated temperatures above the auto-ignition temperature of the fuel (e.g., greater than 600° C.). Such elevated temperatures can degrade the structural integrity of the exhaust silencer, thereby requiring the use of high-temperature materials and insulation layers. High-temperature materials and insulation layers, however, undesirably increase the cost and weight of the exhaust silencer.

SUMMARY

An exhaust silencer assembly for use with an auxiliary power unit includes an eductor and a discharge pipe. The eductor is disposed downstream of the auxiliary power unit and has an entrance opening configured to receive exhaust airflow from the auxiliary power unit. The discharge pipe extends from the auxiliary power unit and communicates with the exhaust silencer assembly downstream of the entrance opening of the eductor.

In another aspect, an assembly includes an auxiliary power unit, an eductor, a discharge pipe, and an air inlet duct. The eductor is disposed downstream of the auxiliary power unit and has an entrance opening configured to receive exhaust airflow from the auxiliary power unit. The eductor has a cooling air inlet opening therein and an acoustic-attenuating porous liner disposed within an interior thereof. The air inlet duct is secured to the eductor and communicates with the interior of the eductor via the cooling air inlet opening. The discharge pipe extends from the auxiliary power unit and communicates with the eductor downstream of the entrance opening of the eductor. The eductor receives a by-pass airflow from the discharge pipe, a cooling airflow from the air inlet duct, and exhaust airflow from the auxiliary power unit.

DETAILED DESCRIPTION

Figure 1:
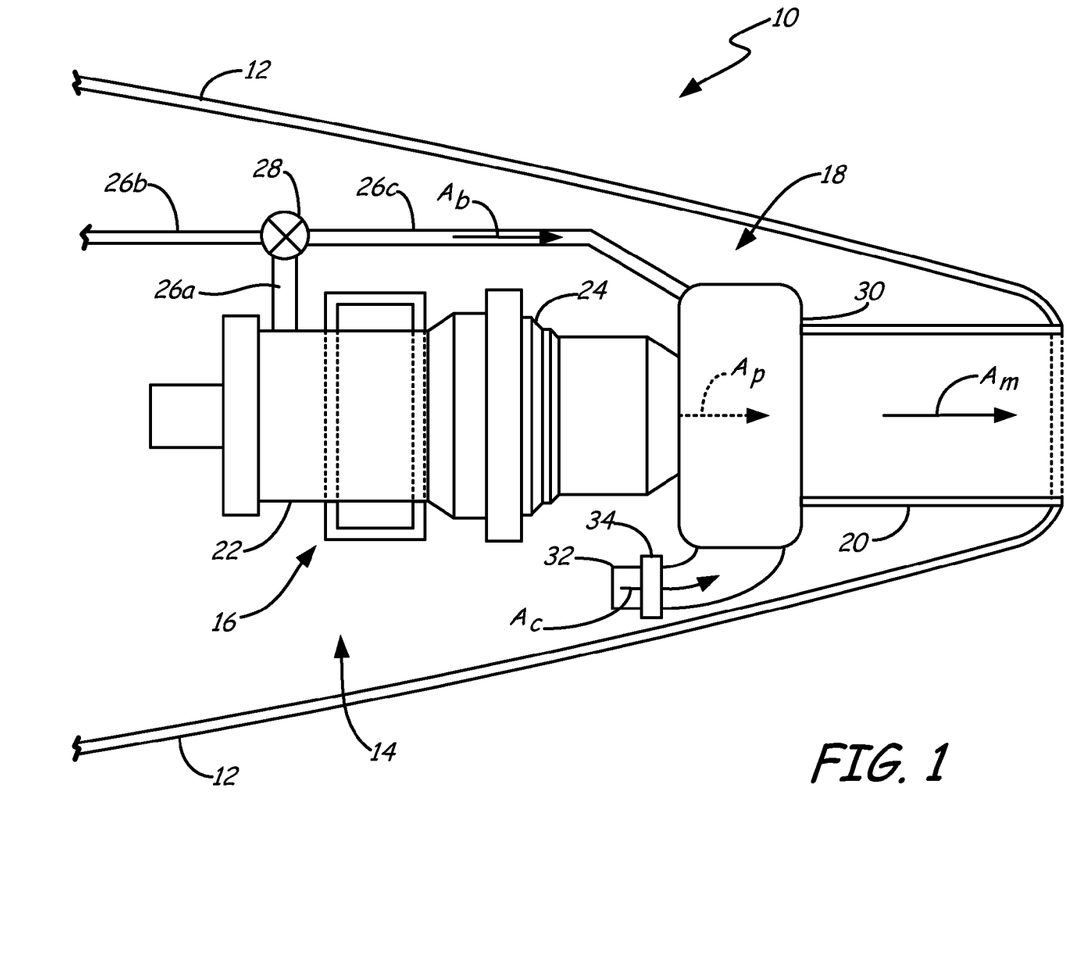
FIG. 1 is a top schematic view of an aircraft tail section that includes an exhaust silencer assembly in use with an auxiliary power unit.

FIG. 1 is a schematic view of aircraft tail section 10, which includes exterior structure 12 and auxiliary power unit (APU) compartment 14. While shown in aircraft tail section 10, APU 16 and exhaust silencer assembly 18 may alternatively be located in any suitable location on an aircraft. APU compartment 14 is formed by exterior structure 12 and contains APU 16, exhaust silencer assembly 18 and exhaust duct 20. APU 16 includes load compressor portion 22 and turbine portion 24. Discharge pipe 26a, 26b, and 26c and valve 28 communicate with APU 16 and various components including exhaust silencer assembly 18 and/or exhaust duct 20. Exhaust silencer assembly 18 is coupled to and disposed downstream from APU 16 and includes discharge pipe 26c, portions of exhaust duct 20, an eductor 30, an air inlet duct 32, and a heat exchanger 34.

The configuration and operation of APU 16 and its components is well known in the art, and is described for example in U.S. Pat. Nos. 7,093,447 and 6,735,951, which are incorporated herein by reference. APU 16 is an on-board gas turbine engine that provides electrical power and a source of pressurized air to the aircraft and its components. Exhaust silencer assembly 18 is adapted to attenuate noise generated by APU 16 during operation. As shown in FIG. 1, discharge pipe 26a, 26b, and 26c transfers pressurized air to the aircraft's environmental control system, main engine starter and/or exhaust silencer assembly 18. Additional components such as air inlet ducts, gearboxes, and generators (not shown) facilitate the operation of APU 16 by transferring electrical power and pressurized air.

During operation, load compressor 22 (typically a centrifugal type compressor) creates high pressure airflow at a high flow rate. During most operating states of aircraft operation, the air compressed by load compressor 22 is fed through discharge pipe 26a and valve 28 to discharge pipe 26b and onward to the aircraft's environmental control system and/or main engine starter. However, in some modes of aircraft operation (e.g., when a generator driven by APU 16 is operating and load compressor 22 is not), valve 28 is switched in order to allow compressed airflow from load compressor 22 to by-pass the remainder of APU 16 via discharge pipe 26a and 26c and enter exhaust silencer assembly 18. As will be discussed subsequently, this by-pass airflow $A_b$ enters exhaust silencer assembly 18 and mixes with primary airflow $A_p$ (exhaust gas) leaving turbine portion 24 of APU 16 to prevent the load compressor of APU 16 from surging or having other mechanical issues.

As shown in the embodiment illustrated in FIG. 1, exhaust silencer assembly 18 is bolted directly onto APU 16. As used herein, the terms "upstream" and "downstream" refer to the direction of the exhaust gas airflow from APU 16, as shown by arrows $A_p$ and $A_M$ in the FIGURES. As shown in FIG. 1, exhaust silencer assembly 18 includes eductor 30 disposed to receive the exhaust gas airflow from APU 16. Eductor 30 comprises an attenuation stage that is secured between APU 16 and exhaust duct 20 and is configured to attenuate noise generated by APU 16 during operation.

Air inlet duct 32 is a pipe that extends from within APU compartment 14 to communicate with eductor 30. Air inlet duct 32 allows secondary cooling airflow $A_c$ to flow to eductor 30 and heat exchanger 34. Heat exchanger 34 comprises a liquid-to-air oil cooler disposed along air inlet duct 32. Heat exchanger 34 cools the oil within APU 16 utilizing the air flowing through air inlet duct 32.

Although not necessary in all embodiments and not illustrated in FIG. 1, air inlet duct 32 can receive air from an active air source such as a discharge fan, which functions as an active source of secondary cooling airflow $A_c$ for eductor 30. Additionally, in an alternative embodiment, air inlet duct 32 may split off from a primary air inlet duct (not shown) that engages with APU 16 or may communicate with the external ambient environment by extending through exterior structure 12 to receive secondary airflow $A_c$ directly therefrom.

Exhaust duct 20 extends from eductor 30 and provides a channel for expelling the spent combustion exhaust gases from aircraft tail section 10. During the course of operation, APU 16 compresses combustion air, adds fuel, and combusts the resulting fuel/air mixture. The resulting hot, high-pressure combustion gas then expands through a turbine stage (not shown) within turbine portion 24. The resulting rotation of the turbines is used to generate electrical power and bleed air for associated devices of the aircraft (not shown). As shown by flow arrow $A_p$, the spent combustion exhaust gases (primary airflow) $A_p$ exit turbine portion 24 and are combined with secondary cooling airflow $A_c$ from air inlet duct 32 and by-pass airflow $A_b$ in eductor 30 and/or exhaust duct 20. The combined airflow $A_M$ (mixed exhaust, by-pass airflow, and cooling airflow) exits the aircraft by traveling down exhaust duct 20.

While operating, APU 16 generates low and high frequency noise that travels downstream from APU 16. To attenuate at least a portion of this noise, exhaust silencer assembly 18 is configured to receive both by-pass airflow $A_b$ and primary airflow $A_P$. This arrangement allows the aircraft to comply with aviation noise standards. This location, however, exposes eductor 30 to the high temperatures of the exhaust gases. Such temperatures may convectively heat downstream components to elevated temperatures that are not desired. To reduce the convective heat transfer from the exhaust gases to eductor 30, air inlet duct 32 directs secondary cooling airflow $A_c$ to attenuation stage 30, thereby reducing temperatures within eductor 30.

Figure 2:
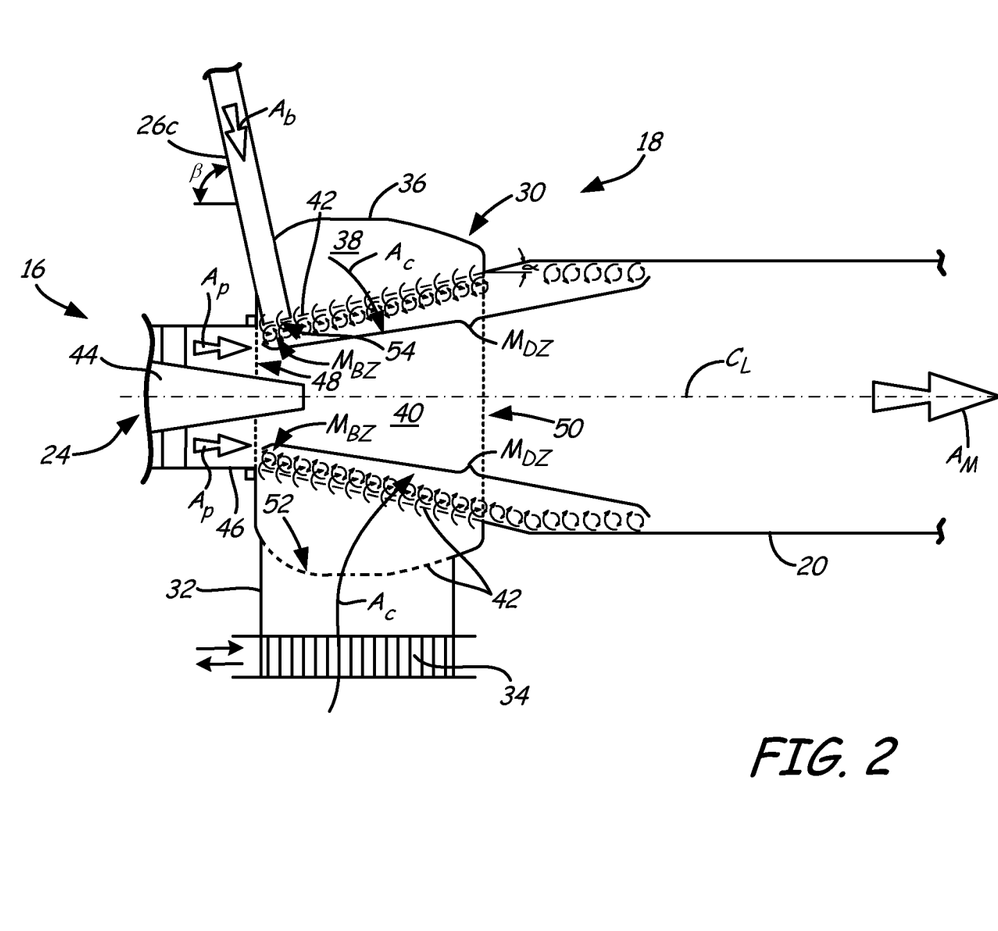
FIG. 2 is a sectional view of the exhaust silencer assembly and portions of the auxiliary power unit and shows a first configuration of an eductor and discharge pipe.

FIG. 2 is a sectional view of portions of turbine section 24 of APU 16 and exhaust silencer assembly 18. FIG. 2 illustrates the interior structure of eductor 30, the flow paths of secondary cooling airflow $A_c$ from air inlet duct 32, primary airflow (exhaust gas) $A_P$, by-pass airflow $A_b$, by-pass mixing zone $M_{BZ}$ (indicated by brackets), and dominant mixing zone $M_{DZ}$. As shown in FIG. 2, eductor 30 includes a casing 36, an outer plenum 38, an inner plenum 40, and an acoustic liner 42. APU 16 includes a turbine centerbody 44 and a turbine flow casing 46. Casing 36 of eductor 30 includes an entrance opening 48, an exit opening 50, and an inlet duct opening 52. Eductor 30 via a hole in acoustic liner 42 includes a by-pass port 54.

Casing 36 is an annular exterior structure of eductor 30 and forms outer surface of hollow outer plenum 38. Inner plenum 40 is disposed radially within outer plenum 38 and is bounded by acoustic liner 42 and casing 36. Acoustic liner 42 is an annular perforated liner disposed between outer plenum 38 and inner plenum 40, and is secured to casing 36.

In the embodiment shown, turbine centerbody 44 includes a cone portion that extends into inner plenum 40. Turbine centerbody 44 is rotatably disposed within turbine flow casing 46 which communicates primary airflow $A_p$ to entrance opening 48 of eductor 30. Outer plenum 38 communicates with air inlet duct 32 via inlet duct opening 52 and communicates with inner plenum 40 via perforations in acoustic liner 42. Inner plenum 40 also communicates upstream with APU 16 via entrance opening 48 in casing 36 and downstream with exhaust duct 20 via exit opening 50 in casing 36.

Thus, entrance opening 48 is disposed adjacent the downstream termination point of turbine flow casing 46, as casing 36 of eductor 30 is bolted directly downstream of APU 16. Entrance opening 48 provides a flow path for primary airflow (exhaust gas) $A_P$ passing into eductor 30. Exit opening 50 provides an exit flow path for all airflows passing out of eductor 30 including secondary cooling airflow $A_c$, primary airflow (exhaust gas) $A_P$, and by-pass airflow $A_b$. A good portion of the airflow passing out of exit opening 50 in eductor 30 will comprise combined airflow $A_M$ as mixing of secondary cooling airflow $A_c$, primary airflow (exhaust gas) $A_P$, and by-pass airflow $A_b$ will occur within by-pass mixing zone $M_{BZ}$ and dominant mixing zone $M_{DZ}$ within eductor 30. However, mixing of airflows does continue downstream of eductor 30 in exhaust duct 20.

Inlet duct opening 52 is another opening in casing 36 located at an outer radial portion thereof. Inlet duct opening 52 provides a flow path for cooling airflow $A_c$ to pass into outer plenum 38 from air inlet duct 32. From outer plenum 38, cooling airflow $A_c$ passes through perforations in acoustic liner 42 to inner plenum 40. As shown in the embodiment illustrated in FIG. 2, discharge pipe 26c transporting by-pass airflow $A_b$ extends through casing 36 and acoustic liner 42 to communicate with inner plenum 40 directly via by-pass port 54. By-pass port 54 can comprise a single passage the size of discharge pipe 26c or can extend arcuately around the entire circumference of acoustic liner 42. In other embodiments by-pass port 54 can comprise several passages. By-pass mixing zone $M_{BZ}$ occurs within inner plenum 40 adjacent by-pass port 54 as by-pass airflow $A_b$ mixes with primary airflow (exhaust gas) $A_P$ downstream of entrance opening 48 and turbine flow casing 46.

Dominant mixing zone $M_{DZ}$ (shown with brackets) occurs at outer radial portions of inner plenum 40 adjacent acoustic liner 42 and downstream thereof along outer radial portions of exhaust duct 20. Dominant mixing zone $M_{DZ}$ results from the confluence of cooling airflow $A_c$ (which passes through perforations in acoustic liner 42) with primary airflow (exhaust gas) $A_P$, and by-pass airflow $A_b$.

Acoustic liner 42 allows cooling airflow $A_c$ to flow around within outer plenum 38 to cool casing 36 during operation. As shown in FIG. 2, the diameter of acoustic liner 42 increases from entrance opening 48 to exit opening 44 at an angle α, where the angle α is an angle relative to a centerline axis $C_L$ of eductor 30 and exhaust duct 20. Examples of suitable angles α range from greater than zero degrees to less than about 45 degrees, with particularly suitable angles α ranging from about 5 degrees to about 20 degrees. The increasing diameter of acoustic liner 42 expands the flow area, enhances the eduction process to draw air from air inlet duct 32 into outer plenum 38, and reduces noise and the exhaust flow velocity.

Acoustic liner 42 is desirably a porous liner that allows cooling airflow $A_c$ and combustion gases to pass through, while also dissipating acoustic energy. In one embodiment, acoustic liner 42 is an annular metallic sheet containing a plurality of passage holes. The passage holes may exhibit a variety of geometric shapes, such as circles, ovals, elongated slots, and combinations thereof.

The combined surface areas of the passage holes are desirably high enough to allow cooling airflow $A_c$ to pass through without pressure build up within outer plenum 38, while also being low enough to dissipate the acoustic energy of the low frequency noise traveling downstream from APU 16. Examples of suitable combined surface areas of the passage holes range from about 5% to about 40% of the total surface area of acoustic liner 42, with particularly suitable combined surface areas ranging from about 10% to about 30% of the total surface area of acoustic liner 42, and with even more particularly suitable combined surface areas ranging from about 15% to about 20% of the total surface area of acoustic liner 42.

During the course of operation, low and high frequency noise travels with the exhaust and by-pass gases downstream from APU 16 to eductor 30. As the noise travels through inner plenum 40, acoustic liner 42 dissipates at least a portion of the acoustic energy, thereby attenuating the noise. While the primary airflow $A_P$ (exhaust gases) travels through inner plenum 40, cooling airflow enters outer plenum 38 from air inlet duct 32. As illustrated by the airflow arrows in FIG. 2, the cooling air flows circumferentially around acoustic liner 42, and penetrates through acoustic liner 42 via the passage holes to mix with the exhaust gases in dominant mixing zone $M_{DZ}$. This cools the exhaust gases as the exhaust gases travel through eductor 30 to exhaust duct 20. Additionally, allowing cooling airflow $A_c$ to pass through acoustic liner 42 reduces the temperature of acoustic liner 42, which reduces high-temperature oxidation, and also reduces risk of the passage holes of acoustic liner 42 being clogged with exhaust soot.

Introducing cooling airflow $A_c$ adjacent casing 36 of attenuation stage 30 also reduces the amount of convective heat that is transferred from the exhaust gases to casing 36. As discussed above, this avoids the need for fabricating casing 36 with high-temperature materials and insulating layers, and thereby can reduce the cost and weight of casing 36. Additionally, the use of exhaust silencer assembly 18 avoids the need of an additional eductor. This further reduces the cost and weight of aircraft tail section 10.

Introducing high pressure by-pass airflow $A_b$ to eductor 30 dissipates at least a portion of the acoustic energy therein, thereby attenuating the noise associated with operation of the load compressor 22 (FIG. 1). As shown in FIG. 2, discharge pipe 26c enters eductor 30 at an angle β, where the angle β is an angle relative to a centerline axis $C_L$ of eductor 30 and exhaust duct 20. Examples of suitable angles β range from about zero degrees to substantially 90 degrees. In some instances, noise associated with operation of the load compressor 22 can be attenuated by up to 2 dB by directing by-pass air to embodiments of exhaust silencer assembly 18 disclosed. Additionally, attenuating noise generated by by-pass airflow $A_b$ with exhaust silencer assembly 18 eliminates the need for duplicative noise attenuation devices thereby reducing the weight of the aircraft.

Figure 3:
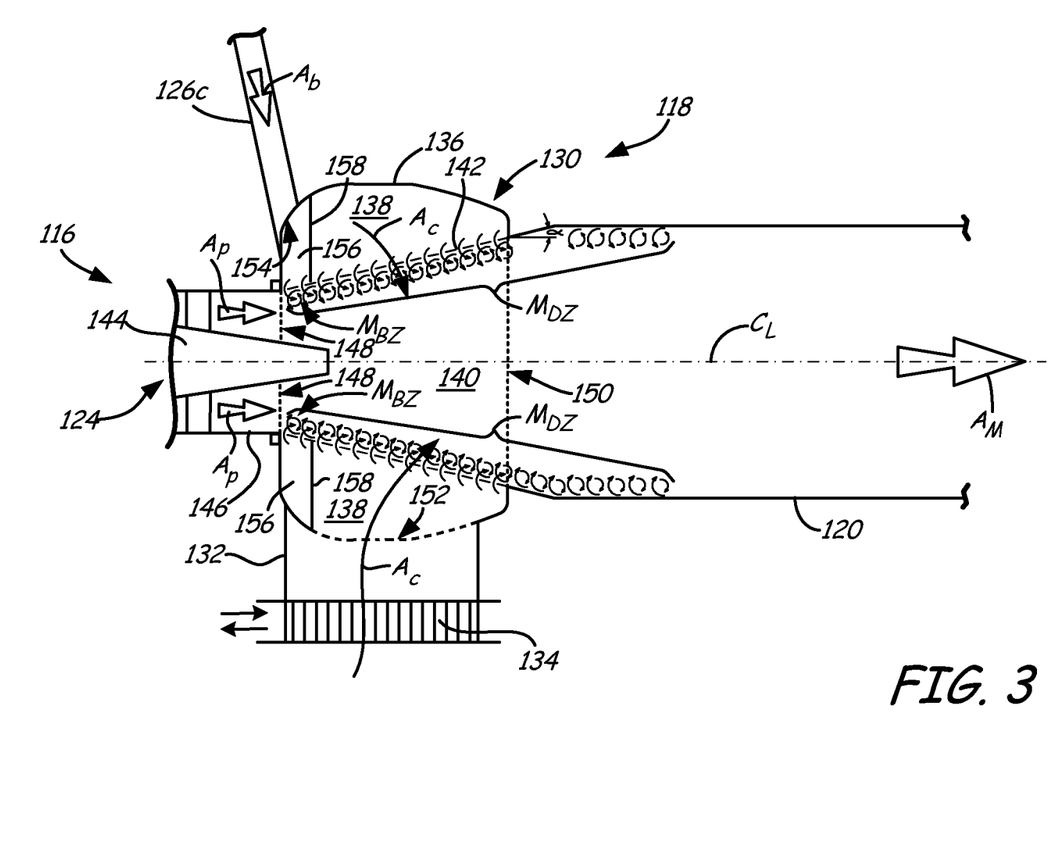
FIG. 3 is a sectional view of the exhaust silencer assembly and portions of the auxiliary power unit and shows a second alternative configuration of an eductor and discharge pipe.

FIGS. 3-6 are sectional views of alternative embodiments to exhaust silencer assembly 18 where the reference numbers of corresponding components are increased by 100 (FIG. 3), 200 (FIG. 4), 300 (FIG. 5), and 400 (FIG. 6), respectively. Thus, FIG. 3 shows exhaust silencer assembly 118 that includes the interior structure of eductor 130, the flow paths of secondary cooling airflow $A_c$ from air inlet duct 132, primary airflow (exhaust gas) $A_P$, by-pass airflow $A_b$, by-pass mixing zone $M_{BZ}$ (indicated by brackets), and dominant mixing zone $M_{DZ}$. As shown in FIG. 3, eductor 130 includes a casing 136, an outer plenum 138, an inner plenum 140, and an acoustic liner 142. APU 116 includes a turbine centerbody 144 and a turbine flow casing 146. Casing 136 of eductor 130 includes an entrance opening 148, an exit opening 150, and an inlet duct opening 152. Eductor 130 via a hole in casing 136 includes a by-pass port 154 and additionally includes forward by-pass plenum 156 and wall 158. Exhaust silencer assembly 118 operates in the same manner as exhaust silencer assembly 18. Structurally, discharge pipe 126c transporting by-pass airflow $A_b$ extends through casing 136 but does not extend through acoustic liner 142. Thus, by-pass port 154 is recessed within forward by-pass plenum 156. Forward by-pass plenum 156 extends arcuately internally within the forward-most axial portion of eductor 130 forward of outer plenum 138. Forward by-pass plenum 156 is formed by casing 136, wall 158, and acoustic liner 142 and has exit openings 155 that allow for communication with inner plenum 140 through porous acoustic liner 142. Similar to the embodiment shown in FIG. 1, by-pass mixing zone $M_{BZ}$ occurs within inner plenum 140 adjacent acoustic liner 142 as by-pass airflow $A_b$ mixes with primary airflow (exhaust gas) $A_P$ downstream of entrance opening 148 and turbine flow casing 146.

Figure 4:
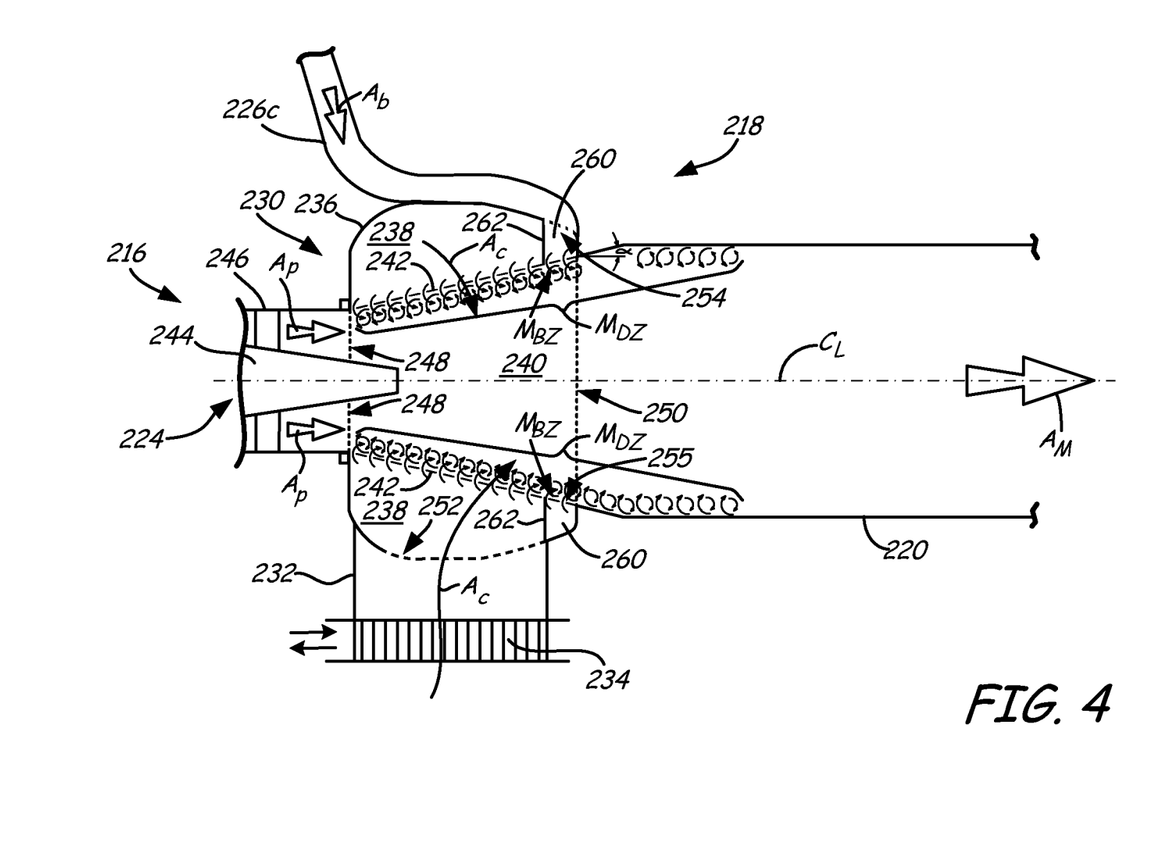
FIG. 4 is a sectional view of the exhaust silencer assembly and portions of the auxiliary power unit and shows a third alternative configuration of an eductor and discharge pipe.

FIG. 4 shows exhaust silencer assembly 218 with the interior structure of eductor 230 illustrated. FIG. 4 illustrates the flow paths of secondary cooling airflow $A_c$ from air inlet duct 232, primary airflow (exhaust gas) $A_P$, by-pass airflow $A_b$, by-pass mixing zone $M_{BZ}$ (indicated by brackets), and dominant mixing zone $M_{DZ}$. As shown in FIG. 4, eductor 230 includes a casing 236, an outer plenum 238, an inner plenum 240, and an acoustic liner 242. APU 216 includes a turbine centerbody 244 and a turbine flow casing 246. Casing 236 of eductor 230 includes an entrance opening 248, an exit opening 250, and an inlet duct opening 252. Eductor 230 via a hole in casing 236 includes a by-pass port 254 and additionally includes aft by-pass plenum 260 and wall 262. Exhaust silencer assembly 218 operates in the same manner as exhaust silencer assembly 118. Discharge pipe 226c transporting by-pass airflow $A_b$ extends through casing 236 but does not extend through acoustic liner 242. Thus, by-pass port 254 is recessed within aft by-pass plenum 260 which is disposed downstream of outer plenum 238. Aft by-pass plenum 260 extends arcuately internally within the aft axial portion of eductor 230 and is formed by casing 236, wall 262, and acoustic liner 242. Aft by-pass plenum 260 has exit openings 255 that allow for communication with inner plenum 240 through porous acoustic liner 242. By-pass mixing zone $M_{BZ}$ occurs within inner plenum 240 adjacent acoustic liner 242 as by-pass airflow $A_b$ mixes with primary airflow (exhaust gas) $A_P$ and cooling airflow $A_c$ adjacent exit opening 250.

Figure 5:
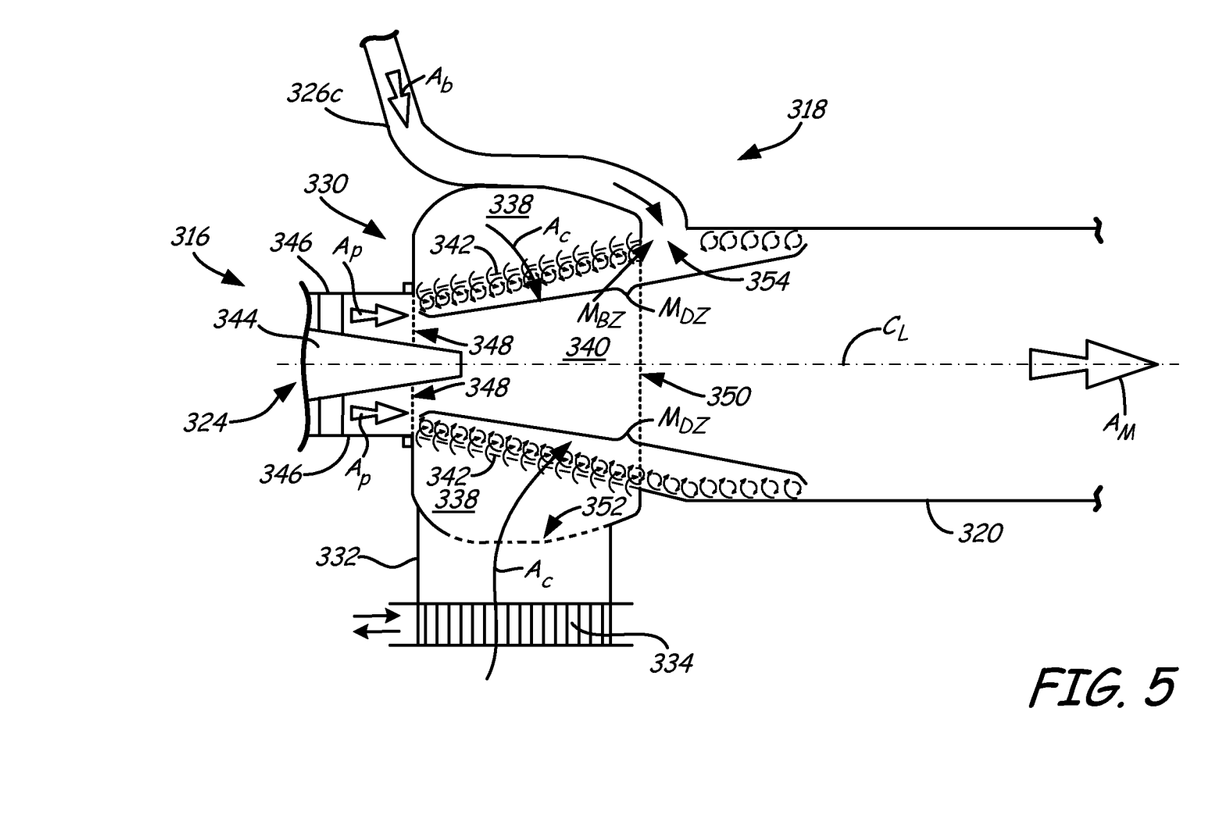
FIG. 5 is a sectional view of the exhaust silencer assembly and portions of the auxiliary power unit and shows a fourth alternative configuration of an eductor and discharge pipe.

FIG. 5 shows exhaust silencer assembly 318 where discharge pipe 326c extends around eductor 330 such that by-pass port 354 is disposed downstream of eductor 330 and communicates directly with exhaust duct 320. FIG. 5 additionally shows the interior structure of eductor 330 including the flow paths of secondary cooling airflow $A_c$ from air inlet duct 332, primary airflow (exhaust gas) $A_P$, by-pass airflow $A_b$, by-pass mixing zone $M_{BZ}$ (indicated by brackets), and dominant mixing zone $M_{DZ}$. As shown in FIG. 5, eductor 330 includes a casing 336, an outer plenum 338, an inner plenum 340, and an acoustic liner 342. APU 316 includes a turbine centerbody 344 and a turbine flow casing 346. Casing 336 of eductor 330 includes an entrance opening 348, an exit opening 350, and an inlet duct opening 352. Exhaust silencer assembly 318 operates in the manner described previously. By-pass mixing zone $M_{BZ}$ occurs downstream of exit opening 350 within exhaust duct 320 adjacent the casing thereof as by-pass airflow $A_b$ mixes with primary airflow (exhaust gas) $A_p$ and cooling airflow $A_c$.

Figure 6:
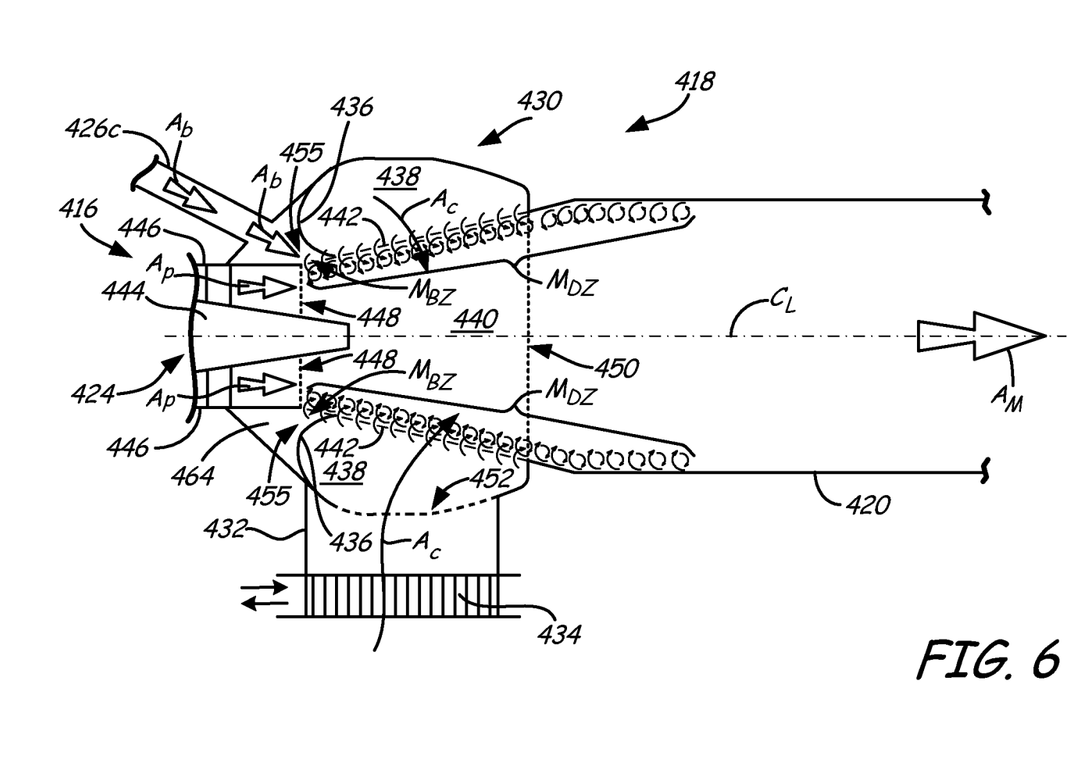
FIG. 6 is a sectional view of the exhaust silencer assembly and portions of the auxiliary power unit and shows a fifth alternative configuration of an eductor and discharge pipe.

FIG. 6 shows exhaust silencer assembly 418 which additionally includes a plenum 464 upstream of eductor 430. FIG. 6 additionally shows the interior structure of eductor 430 including the flow paths of secondary cooling airflow $A_c$ from air inlet duct 432, primary airflow (exhaust gas) $A_P$, by-pass airflow $A_b$, by-pass mixing zone $M_{BZ}$ (indicated by brackets), and dominant mixing zone $M_{DZ}$. As shown in FIG. 6, eductor 430 includes a casing 436, an outer plenum 438, an inner plenum 440, and an acoustic liner 442. APU 416 includes a turbine centerbody 444 and a turbine flow casing 446. Casing 436 of eductor 430 includes an entrance opening 448, an exit opening 450, and an inlet duct opening 452. Exhaust silencer assembly 418 operates in the same manner as described previously. Discharge pipe 426c transporting by-pass airflow $A_b$ extends forward of casing 436 and does not pass through casing 436 or acoustic liner 442. Plenum 464 extends arcuately external to the forward-most axial portion of eductor 430 and is partially formed by casing 436 along with turbine flow casing 446. Plenum 464 has an exit opening 455 that is disposed at or downstream of the termination of turbine flow casing 446. Similar to the embodiment shown in FIG. 1, by-pass mixing zone $M_{BZ}$ occurs in or adjacent inner plenum 440 near entrance opening 448 to eductor 430 as by-pass airflow $A_b$ mixes with primary airflow (exhaust gas) A.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An exhaust silencer assembly, comprising:
   an eductor disposed downstream of an auxiliary power unit and including an entrance opening at a forward axial end thereof, the entrance opening configured to receive exhaust airflow from the auxiliary power unit;
   an acoustic-attenuating porous liner disposed within an interior of the eductor axially downstream of the entrance opening, the porous liner separating a radially outer plenum from a radially inner plenum of the eductor;
   a discharge pipe extending from the auxiliary power unit and communicating with the exhaust silencer assembly downstream of the entrance opening of the educator, wherein the discharge pipe extends through both an outer casing of the eductor and the porous liner; and
   an air inlet duct secured to the eductor and communicating with the outer plenum of the eductor via a cooling air inlet opening therein.

2. The exhaust silencer assembly of claim 1, wherein the eductor receives a by-pass airflow from the discharge pipe, a cooling airflow from the air inlet duct, and exhaust airflow from the auxiliary power unit and includes a plurality of mixing zones where the airflows are mixed therein.

3. The exhaust silencer assembly of claim 1, wherein the eductor includes a by-pass plenum disposed forward of the outer plenum, the by-pass plenum communicates with the discharge pipe and includes an opening to the inner plenum that is disposed downstream of the entrance opening of the eductor.

4. The exhaust silencer assembly of claim 1, wherein the eductor includes a by-pass plenum disposed aft of the outer plenum, the by-pass plenum communicates with the discharge pipe and includes an opening to the inner plenum that is disposed downstream of the entrance opening of the eductor.

5. An assembly, comprising:
   an auxiliary power unit;
   an eductor disposed downstream of the auxiliary power unit and including an entrance opening at a forward axial end thereof, the entrance opening configured to receive exhaust airflow from the auxiliary power unit, the eductor including a cooling air inlet opening therein and an acoustic-attenuating porous liner disposed within an interior thereof;
   a discharge pipe extending from the auxiliary power unit and communicating with the eductor downstream of the entrance opening; and
   an air inlet duct secured to the eductor and communicating with the interior thereof via the cooling air inlet opening;
   wherein the eductor receives a by-pass airflow from the discharge pipe, a cooling airflow from the air inlet duct, and exhaust airflow from the auxiliary power unit.

6. The assembly of claim 5, further comprising a heat exchanger disposed along the air inlet duct.

7. The assembly of claim 5, wherein the assembly is disposed in the tail section of an aircraft.

8. The assembly of claim 5, wherein the discharge pipe extends through both an outer casing of the eductor and the porous liner.

9. The assembly of claim 6, wherein the eductor includes a by-pass plenum disposed at a forward end thereof, the by-pass plenum communicates with the discharge pipe and includes an opening to the remainder of the eductor that is disposed downstream of the entrance opening.

10. The assembly of claim 5, wherein the eductor includes a by-pass plenum disposed at an aft end thereof, the by-pass plenum communicates with the discharge pipe and includes an opening to the remainder of the eductor that is disposed downstream of the entrance opening.

11. The assembly of claim 5, further comprising a by-pass plenum disposed forward of the eductor, the by-pass plenum communicates with the discharge pipe and includes an opening that is disposed at or downstream of the termination of a turbine flow casing.

12. The assembly of claim 5, further comprising an exhaust duct and wherein the discharge pipe communicates directly with the exhaust duct downstream of the eductor.

13. An exhaust silencer assembly, comprising:
- an eductor disposed downstream of an auxiliary power unit and including an entrance opening at a forward axial end thereof, the entrance opening configured to receive exhaust airflow from the auxiliary power unit;
- an acoustic-attenuating porous liner disposed within an interior of the eductor axially downstream of the entrance opening, the porous liner separating a radially outer plenum from a radially inner plenum of the eductor;
- an exhaust duct downstream of the eductor, the exhaust duct configured to receive airflow from the eductor; and
- a discharge pipe extending from the auxiliary power unit and communicating with the exhaust duct downstream of the eductor.

14. The exhaust silencer assembly of claim 13, wherein the exhaust duct receives a by-pass airflow from the discharge pipe and a by-pass mixing zone occurs downstream of the eductor in the exhaust duct.

15. The exhaust silencer assembly of claim 13, wherein the eductor includes an air inlet duct secured to the eductor and communicating with the outer plenum of the eductor via a cooling air inlet opening.

16. The exhaust silencer assembly of claim 1, wherein the eductor includes a by-pass plenum that communicates with the discharge pipe and includes an opening to the remainder of the eductor that is disposed downstream of the entrance opening.

17. An exhaust silencer assembly, comprising:
- an eductor disposed downstream of an auxiliary power unit including an entrance opening configured to receive exhaust airflow from the auxiliary power unit;
- an acoustic-attenuating porous liner disposed within an interior of the eductor axially downstream of the entrance opening, the porous liner separating a radially outer plenum from a radially inner plenum of the eductor;
- a cooling air inlet opening in the eductor;
- a discharge pipe extending from the auxiliary power unit and communicating with the eductor downstream of the entrance opening; and
- an annular by-pass plenum within the eductor, the by-pass plenum communicates with the discharge pipe.

* * * * *